United States Patent
Excell et al.

(10) Patent No.: US 6,714,555 B1
(45) Date of Patent: Mar. 30, 2004

(54) BROADBAND TELECOMMUNICATIONS SWITCH

(75) Inventors: Michael John Excell, Hampshire (GB); Ian Lesseter Phillips, Hampshire (GB); Christopher Paul Urry, Hampshire (GB); Andrew Timothy Hayter, Hampshire (GB)

(73) Assignee: Roke Manor Research Limited, Romsey (GB)

( * ) Notice: Subject to any disclaimer, the term of this patent is extended or adjusted under 35 U.S.C. 154(b) by 0 days.

(21) Appl. No.: 09/445,211

(22) PCT Filed: May 25, 1998

(86) PCT No.: PCT/EP98/03063
§ 371 (c)(1),
(2), (4) Date: May 22, 2000

(87) PCT Pub. No.: WO98/56144
PCT Pub. Date: Dec. 10, 1998

(30) Foreign Application Priority Data

Jun. 4, 1997 (GB) ............................................. 9711396

(51) Int. Cl.⁷ ............................................. H04L 12/28
(52) U.S. Cl. ................... 370/418; 370/395.43
(58) Field of Search ............................. 370/229, 230, 370/235–236.1, 389, 395.1, 395.2, 395.21, 395.3, 395.4, 395.41, 395.42, 395.43, 412–422, 428–9

(56) References Cited

U.S. PATENT DOCUMENTS

| | | | |
|---|---|---|---|
| 5,517,495 A | 5/1996 | Lund et al. | |
| 5,546,377 A | 8/1996 | Ozveren | |
| 5,872,769 A * | 2/1999 | Caldara et al. | 370/230 |
| 6,046,981 A * | 4/2000 | Ramamurthy et al. | 370/232 |
| 6,067,298 A * | 5/2000 | Shinohara | 370/395.71 |
| 6,097,722 A * | 8/2000 | Graham et al. | 370/395.21 |
| 6,304,549 B1 * | 10/2001 | Srinivasan et al. | 370/230 |
| 6,324,165 B1 * | 11/2001 | Fan et al. | 370/232 |
| 6,349,097 B1 * | 2/2002 | Smith | 370/390 |
| 6,430,187 B1 * | 8/2002 | Park | 370/397 |
| 6,490,248 B1 * | 12/2002 | Shimojo | 370/229 |

FOREIGN PATENT DOCUMENTS

| | | |
|---|---|---|
| EP | 0 677 941 A2 | 10/1995 |
| EP | 0 677 941 A3 | 10/1995 |
| EP | 0 763 915 A2 | 3/1997 |
| GB | 2 272 820 A | 5/1994 |
| GB | 2 288 096 A | 10/1995 |
| GB | 2 307 823 A | 6/1997 |

OTHER PUBLICATIONS

"An Output–Buffered ATM Switch in the Multichannel Bandwidth Allocation Environment" Wen De Zhong and Yoshikuni Onozato, Electronics and Communications in Japan, Part I: Communications; 74 (1991) Jun., No. 6, New York, US—pp. 13–23.

"A Multiservice High–performance Packet Switch for Broad–Band Networks" Achille Pattavina,—IEEE Transactions on Communications 38(1990) Sep., No. 9, New York, US—pp. 1607–1615.

* cited by examiner

Primary Examiner—David Vincent
(74) Attorney, Agent, or Firm—Crowell & Moring LLP

(57) ABSTRACT

A broadband telecommunications switch (1), for switching packets of data received on a plurality of input ports (5) to plurality of bandwidth limited output ports (10), comprising for each input port (5) a control processor (22) which operates to send request data for each of a plurality of switching periods to each output port (10), which request data is representative of a requirement for communications bandwidth from said output ports (10) sufficient to accommodate packets of data received at said input ports (5) for switching to said output ports (10) for the switching period. Each of said bandwidth allocators (24) responds to said request data by generating bandwidth allocation data appertaining to an allocation of a share of the bandwidth of the output port (10) to the input port (5), which share of bandwidth said input port (5) uses to switch data from said input ports to said output ports during said switching period.

30 Claims, 2 Drawing Sheets

BROADBAND TELECOMMUNICATIONS SWITCH

Figure 1:
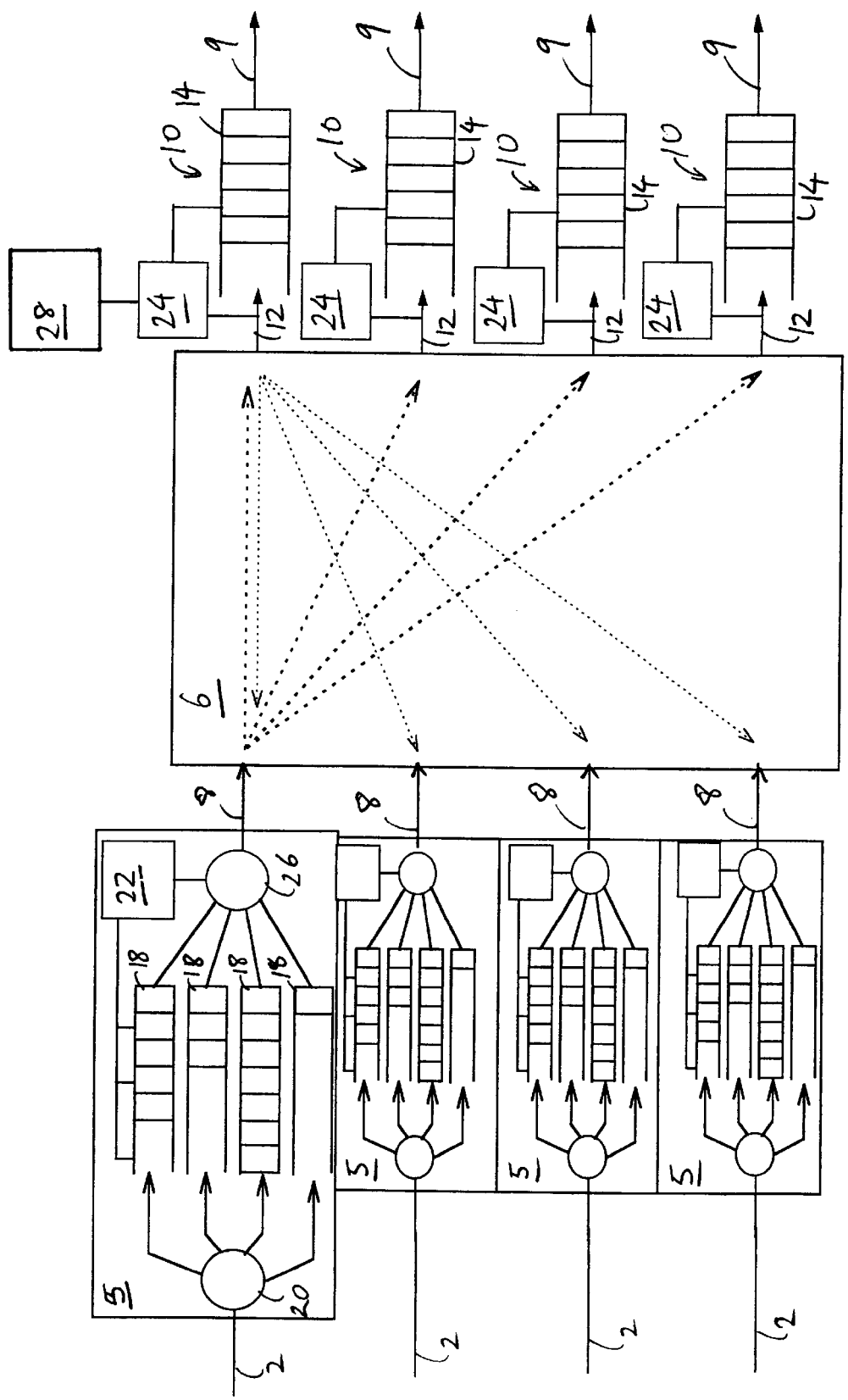

The present invention relates to broadband telecommunications switches which operate to switch packets or cells of data from a plurality of input ports to a plurality of output ports. In particular, but not exclusively, the present invention relates to broadband telecommunications switches which operate in accordance with Asynchronous Transfer Mode (ATM) principles.

Telecommunications systems which communicate data at rates in the order of mega bits per second are known as broadband telecommunications systems. In order to effect communication of data at such high rates between a plurality of sources and a plurality of receivers, telecommunications systems are adapted to make optimum use of an amount of data communications bandwidth provided by a telecommunications network. To this end, broadband telecommunications systems operate to communicate data in a form of discrete packets or cells which carry a predetermined amount of information. An example of such a broadband telecommunications system is an Asynchronous Transfer Mode (ATM) telecommunications system, wherein data is conveyed in ATM cells. Each ATM cell comprises a predetermined quantity of data as well as a cell header, which contains a virtual channel identifier and a virtual path identifier which are used by nodes or switches of a telecommunications network to route the ATM cells between sources and receivers.

To achieve an efficient utilisation of a data communications bandwidth provided by a telecommunications network, telecommunications systems may further operate to provide a predetermined series of data transport media characterised by predefined data transmission parameters such as delay, integrity and cell rate. The telecommunications system is therefore arranged to provide a series of virtual communications paths, each of which is arranged to communicate data in accordance with the predetermined transmission parameters. Such communications paths are known as bearers, each of which is defined by the attributes of the data which it is to communicate. Hence, by selecting an appropriate bearer, a user of the telecommunications network is provided with a cost effective means for communicating broadband data in accordance with the type and attributes of data the user is generating.

Bearer types may include Constant Bit Rate (CBR) which may be delay and integrity critical. An example of a service carried by a CBR bearer is voice or speech data. Other bearer types include Variable Bit Rate (VBR) which is provided for data sensitive to losses and some tolerance to delay, and Available Bit Rate (ABR) which is loss sensitive but comparatively delay insensitive. There is also a data bearer type for data which is insensitive to both delay and integrity, which is known as Unspecified Bit Rate (UBR). CBR, ABR, VBR and UBR are defined for ATM in accordance with the ATM Forum.

In order to switch data received on an input port of a broadband telecommunications switch to a plurality of output ports, the broadband telecommunications switch must operate at a substantially higher rate than the rate at which data is received on the input port. To effect the switching operation, a core of the broadband telecommunications switch operates to interrogate packets of data received from an input port to determine which of the plurality of output ports the data packets should be sent, and routes the packets from the input port to the corresponding output port. If there are n output ports associated with a broadband telecommunications switch, then the core must operate at a rate of n multiplied by the bit rate or bandwidth associated with any input port, if no delay or loss of data is to be incurred in association with the switching operation. Furthermore, if there are n input ports, then the rate of processing of the switch core must be $n^2$ multiplied by the bit rate or bandwidth of receiving data on any one input port.

In order to reduce the processing rate required of the switch core, known ATM switches are provided with data buffers which are operatively associated with each of the input ports, and which operate to store ATM cells at the input port until an output port to which they are to be switched has sufficient capacity to receive these ATM cells. This allows for a substantial reduction in the processing rate of the switch core. An example of a known ATM switch is disclosed in granted UK patent number 2272820B.

As with the input ports, a data rate or bandwidth limit for communicating data is associated with each of the output ports. Typically, but not exclusively, the data rate of the input ports is equal to the data rate of the output ports which are also equal to each other. As such, communications bandwidth associated with the output port is bandwidth limited, so that a technical problem exists in arranging for data packets received on the input port to be switched between the output ports whilst accommodating the bandwidth limit associated with each output port, and insuring that no data packet is lost in communication between the input ports and the output ports.

The technical problem of switching data packets from a plurality of input ports to a plurality of output ports, which output ports are bandwidth limited, is addressed by the present invention.

According to the present invention there is provided a broadband telecommunications switch for switching packets of data received on a plurality of input ports to a plurality of bandwidth limited output ports, said switch comprising for each input port a control processor which operates to communicate request data for each of a plurality of switching periods to each of a plurality of bandwidth allocators operatively associated with said output ports, which request data is representative of a request for communications bandwidth from said output ports sufficient to accommodate packets of data received at said input ports during a corresponding switching period, wherein each of said bandwidth allocators responds to said request data by generating bandwidth allocation data appertaining to an allocation of a share of the bandwidth of the output port to the input port and communicates bandwidth allocation data to each of said input ports, which share of bandwidth said input port uses to switch said data packets from said input ports to said output ports.

The request data may represent a number of data packets received at the input port during the corresponding switching period.

Each of said input ports may further include for each output port a data store for buffering data packets received at the input port before being communicated to a respective output port via said switch core. The control processor associated with each input port may operate to generate request data in accordance with a number of data packets present in said data stores for communication to said output ports.

Switching of data packets between input ports and the output ports of a broadband telecommunications switch represents a task of some considerable complexity. This is because there is not only a wide variation in data rates of data arriving at the input ports of the switch, but also a plurality of bearer types with different integrity and delay sensitivities. By arranging for a control processor associated with each input port to periodically transmit to each of the output ports request data representative of a bandwidth requirement from the corresponding output port sufficient to egress the data received at the input port for a given switching period, the allocation of the bandwidth of the output ports to the input ports may be effected in a quasi synchronous manner, the effect of which is to substantially reduce the complexity of the switch compared to a switch where bandwidth allocation is executed asynchronously.

Although allocation of the bandwidth of the output ports is effected in a quasi synchronous manner, switching of data packets is effected asynchronously.

The switching period is a period of time for which the bandwidth allocation of the output ports to each of the input ports is substantially constant. Determination of the bandwidth allocation of the output ports to the input ports for the associated switching period may be determined in correspondence with a predetermined temporal position within the corresponding switching period. The corresponding switching period and the associated switching period may be the same switching period.

The temporal position within the corresponding switching period at which the bandwidth of the output ports is allocated to the input ports, may be determined by a polling event.

The polling event may be determined by an common clock which generates synchronisation signals fed to each of said control processors.

Each input port may be co-located with an associated output port so that the control processor of an input port may be operatively associated with a bandwidth allocator of a corresponding output port. The polling events may be determined by a temporal position at which each of the plurality of bandwidth allocators receives a request data communication from one of said control processors, in response to which each of the control processors operatively associated with the bandwidth allocators also communicate a request data.

Each of the bandwidth allocators may further include a data store for storing limit table data appertaining to a predefined relationship between an amount of data to be switched from an input port to an output port for a switching period in correspondence with a bandwidth of the output port to be allocated to the input port for switching said data. Each of the control processors associated with the output ports may furthermore operate in combination with the limit table data to generate a limited bandwidth allocation determined in dependence upon a number of data packets to be communicated from the input port to the output port.

Advantageously, the telecommunications switch may further operate to switch data from a Constant Bit Rate bearer across the switch core in preference to other data and to the request data.

The bandwidth of the output ports allocated to the input ports for switching Variable Bit Rate and Available Bit Rate (ABR) data, may be that which remains when bandwidth allocated to CBR bearers is subtracted from a total link bandwidth associated with the output ports.

The telecommunications switch may further operate to allocate surplus bandwidth to Unspecified Bit Rate bearers appertaining to the bandwidth of the output ports which has not been allocated to the input ports, as a result of a bandwidth allocation limit determined in dependence upon the limit table.

Advantageously, the control processors may operate to weight each share of the allocated bandwidth from the output ports, so that a total of each share of the bandwidth of the output ports does not exceed a total link bandwidth of a link communicating the input port to the switch core.

According to an aspect of the present invention there is provided a method of switching data packets from a plurality of input ports to a plurality of output ports across a switch core, comprising the steps of, (i) for each input port generating request data representative of a number of data packets to be switched by said input port to respective output ports, (ii) for each input port contemporaneously switching the request data generated in step (i) across the switch to said respective output ports, (iii) for each output port determining a share of the bandwidth of the output port to provide said input ports in accordance with said request data received from the input ports, and conveying bandwidth allocation data corresponding to the bandwidth of the output port allocated to each input port across the switch core to each of the input ports, thereby allocating the bandwidth of the output ports to the input ports for a predetermined switching period to effect egress communication of the data packets.

Figure 2:
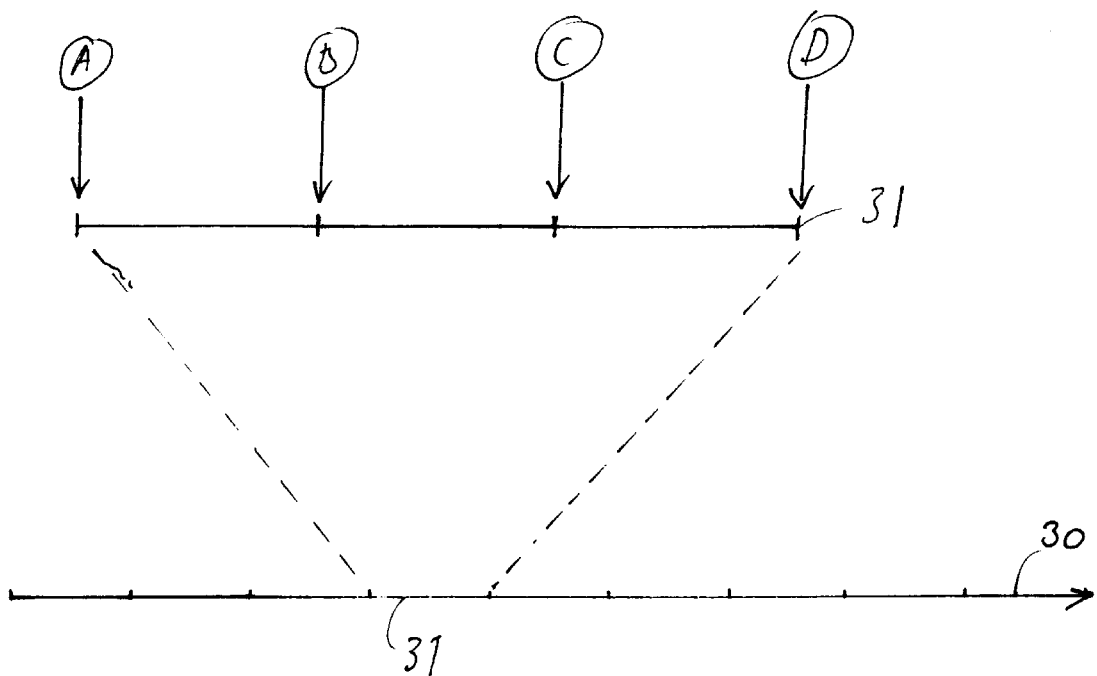

One embodiment of the present invention will now be described by way of example only with reference to the accompanying drawing, wherein, FIG. 1 shows a schematic conceptual diagram of a broadband tele-communications switch;

FIG. 2 shows a schematic timing diagram of events which occur during a switching period.

The example embodiment provided is a broadband telecommunications switch operating in accordance with Asynchronous Transfer Mode (ATM) principles. To this end, FIG. 1 shows a schematic block diagram of an ATM telecommunications switch, designated generally as 1.

In FIG. 1, four input transmission means represented as lines 2, are shown to feed each of four input ports designated generally 5. Each of the input ports 5, are coupled to an ATM switch core 6, by conductors 8. Data traversing the switch core 6 is fed to one of the four output ports designated generally 10, which is thereafter egressed on an output transmission line 9, which communicates with the rest of a broadband telecommunications system.

In this example embodiment of the invention, each of the transmission lines 2, on the input side of the switch, and the output side of the switch 9, communicate ATM cells at a rate of 150 mega bits per second. As such it is the function of the switch 1, to switch ATM cells from the input conductors 2 to the output conductors 9, in accordance with the connection identifying information provided in the header of the ATM cells, which header contains the virtual path and virtual channel identifiers. Within the ATM switch 1, the switch core 6 operates to switch the ATM cells between the input conductors 8 and the output conductors 12, in accordance with the switching operation. As hereinbefore explained, the switch core 6, acts as a routing or switching processor. The switch core 6, is provided with some data storage capacity (not shown) for storing data packets to be switched to output ports, in a situation in which input ports send data packets to the same output port contemporaneously. The data storage capacity of the switch core 6, therefore operates to de-couple the switching of data packets between input ports and output ports.

Each of the output transmission lines 9, has a data capacity of 150 mega bits per second and are therefore bandwidth limited. Each output port further includes a data store 14, which acts as a buffer for ATM cells which are egressed from the output port 10. The data stores 14, serve to re-shape ATM cell traffic which is egressed from the output port 10.

As has been previously explained, in order to arrange for the ATM cells received on each of the input lines 2, to be switched to the output ports 10 without loss of ATM cells or delay, the switch core 6, would have to be arranged to switch ATM cells at a rate proportional to the square of the number of input lines 2, multiplied by the communication data rate bandwidth on any one of the input ports. This is because in order to switch data from all of the input ports to one of the output port, the ATM switch port 6, would have to operate at a rate proportional to n multiplied by the data rate of the input line, where n is the number of input ports, and this data rate would have to be provided for each of the output ports, hence, the rate of switching of the ATM switch core 6, would be proportional to $n^2$ multiplied by the data rate on any one of the input lines. However, in each of the input ports 5, there is provided a data store 18, for each of the output ports 10. Furthermore, there is also provided a switching node 20, which serves to switch ATM cells received on the input line 2, to each of the buffers 18, in accordance with the output port to which the ATM cells are to be switched. This arrangement of the switching node 20 and the data stores 18, for each of the output ports, has an effect such that switching of data from the input port to each of the output ports need only be performed at a rate which is on average proportional to the data rate of the input line 2. Therefore, in this case, the rate of operation of the switch core may be reduced to n multiplied by the communications data rate bandwidth of any of the input lines 2, and since n=4, the rate in this case is 600 mega bits per second.

The ATM switch 1, thus far described, is provided with a means to separate ATM cells destined for each of the output ports, into a corresponding number of data stores 18, at each of the input ports 5. The arrangement by which the ATM switch 1, switches the ATM cells present in the input buffers of the input port 5, to the output ports 10, whilst accommodating the bandwidth limitation of the output ports 10 will now be described.

Each of the input ports 5, is provided with a control processor 22, which operates to interrogate each of the input data stores 18, to assess the number of cells present in the data stores at the start of a switching period. The switching period may, for example, be in the order of 7 ms. The control processor 22, determines the number of cells stored in data stores 18, which are to be switched for the current switching period. After determining the number of cells present in each of the input data stores 18, the control processor 22 generates an ATM cell which contains request data representative of the number of ATM cells in the data stores 18, at a predetermined temporal position within the corresponding switching period. This ATM cell containing request data, hereafter referred to as the request data cell, is fed via conductor 8, to the ATM switch core 6, which thereafter performs a multicast operation, wherein the request data cell is replicated and switched to each of the output ports 10. This operation is repeated by each of the control processors 22 in each of the input ports 5.

At each of the output ports 10, a bandwidth allocator 24, receives the request data cells via conductor 12, from each of the input ports 5. As hereinbefore mentioned, the bandwidth of the output port is limited to the link bandwidth of the conduct 12, which is 150 mega bits per second. However, a portion of this bandwidth may be allocated to a Constant Bit Rate (CBR) bearer and so the bandwidth of the link 12, remaining, after subtraction of the portion allocated to CBR bearers is that which is available to be shared amongst the input ports in accordance with the request data cell. The bandwidth allocator 24, operates to apportion the share of this available bandwidth between the respective input ports 5, in accordance with the request data cells received therefrom. The bandwidth allocator 24, then transmits a bandwidth allocation ATM cell containing data representative of the bandwidth allocated to each of the input ports 5, by the output ports (10), and the bandwidth allocation cell is multicast across the ATM switch core 6, so that the same cell is communicated to each of the input ports 5. This operation is performed by each bandwidth allocator 24, for each of the output ports 10. The bandwidth allocation cells are received by each of the input ports 5, and fed to the control processor 22.

After receiving the bandwidth allocation cells, the control processors 22, are in receipt of the necessary information to switch the ATM cells in the input data buffers 18, across the ATM switch for an associated switching period which may be a next subsequent switching period. However, the control processor 22, must perform one further operation before configuring the input port to switch ATM cells at a desired rate appertaining to the bandwidth allocation. The further operation is required to ensure that a total of the shares of allocated bandwidth from each output port does not exceed a total link bandwidth of the communication links 8, between the input ports 5 and the switch core 6. To do this the control processors 22, sum each share of the bandwidth allocations from the output ports, and when the sum exceeds the total link bandwidth, scales the bandwidth share so that the total link bandwidth is not exceeded. For example, if three output ports operate to provide an input port with a share of 75 mega bits per second, then the total bandwidth allocated to the input port would be 225 mega bits per second. Therefore, in this example, the control processor 22, would be configured in combination with switching node 26, so that the rate of transmitting ATM cells across the switch core 6, to each of these output ports is reduced to 50 mega bits per second. This, of course, will result in some surplus bandwidth being unused at the output ports. However, it would present a further level of complexity to re-allocate this bandwidth, and since this will only remain unused for one switching period, this wasted capacity is minimised.

In accordance with the bandwidth allocation, the control processor 22, operates to feed ATM cells from each of the input data stores 18, via a switching node 26, to the ATM switching core 6, which thereafter switches the ATM cells to the respective output ports.

The process of allocating bandwidth of the output ports to the input ports hereinbefore described is performed for each of a plurality of switching periods. During a current switching period a polling event at a predetermined temporal position synchronises the transmission of the request data by each of the control processors 22, to the bandwidth allocators 24. This is indicated conceptually by a timing diagram shown in FIG. 2. In FIG. 2, line 30 represents time which increases from left to right. The time line 30, is divided into a plurality of switching periods of which switching period 31 is one example. Switching period 31, is also shown in FIG. 2 in an expanded form, in which four events designated A, B, C and D are indicated conceptionally. Event A is representative of the transmission of request data by each of the input ports to each of the output ports. Event B is representative of the sharing by the bandwidth allocators 24, of the available bandwidth of the output port amongst the input ports, and the transmission of the allocation data to the control processors 22, within the input ports 5. Event C is representative of the new allocation of bandwidth to input ports becoming established, whereas event D is representative of the new allocation being effective for the subsequent switching period.

The arrangement for switching ATM cells between a plurality of input ports and a plurality of output ports, as hereinbefore described with reference to FIG. 1, is suitable for ATM cells which are tolerant to delay. As such, if ATM cells are being communicated in association with a Constant Bit Rate (CBR) bearer, which are therefore delay sensitive, the ATM switch operates to switch these ATM cells, through the switch core 6, to the corresponding output ports 10, without buffering in any of the input ports 5 or the output ports 10. It is for this reason that bandwidth allocated to CBR bearers is subtracted from the total link bandwidth of the output port to establish the bandwidth available for sharing with the input ports. The arrangement of buffering data at the input ports and output ports as hereinbefore described, is therefore only appropriate for ATM cells conveyed in association with a Variable Bit Rate (VBR) or Available Bit Rate (ABR) bearers, wherein the bearer provides for a degree of delay insensitivity. Furthermore, ATM cells conveyed in association with an Unspecified Bit Rate (UBR) bearer, will be both delay and loss insensitive. Therefore, ATM cells conveyed in association with VBR and ABR bearers will be given priority over ATM cells conveyed in association with a UBR bearer. As such, the arrangement for allocating bandwidth of the output ports 10, to the input ports 5, may be extended to allocating bandwidth to UBR ATM cells, where surplus bandwidth is available at an output port 10. Surplus bandwidth may be made available by an output port 10 in a situation in which there is a demand for a share of the bandwidth of an output port from one or more of the input ports, for only a comparatively small number of ABR or VBR ATM cells for a switching period. If the entire bandwidth of the output port 10, were to be allocated to these input ports 5, then the ATM cells in the input data stores 18, of each input port would be switched to the output port in a comparatively small portion of the switching period. Therefore, in this situation, the capacity of the output port would remain unused for a substantial portion of a switching period, whereas it could in fact be used for switching UBR ATM cells.

To utilise the available surplus bandwidth at any of the output ports 10, each of the bandwidth allocators 24, is further provided with a date store 28, which is shown by example for one of the bandwidth allocators only. Each data store 28, is provided with data representative of a limit table. The limit table is a predetermined relationship between an amount of bandwidth of the output ports to be allocated to the input ports 5, and the amount of data present in the input data buffers 18, to be switched to the output ports 10, such that in the event that a substantial portion of the bandwidth of an output port is to be allocated to an input port for which only a relatively small amount of data is to be switched during a switching period, the limit table determines a limited bandwidth to be allocated to the input port 5, in proportion to the amount of data to be switched. So, for example, where the bandwidth of 150 mega bits per second associated with an output port is to be shared equally between two input ports, then without the operation of the limit table, each port would have a share of 75 mega bits per second. However, where a relatively small number of cells are present at the input buffer associated with the input port, the limit table operates to reduce the 75 mega bits per second to, for example, 10 mega bits per second, thus freeing a further 65 mega bits per second for allocation to UBR data services.

An arrangement of input data buffers 18, associated with the input ports 5, is also provided for switching UBR ATM cells in a substantially similar manner to that described for VBR and ABR ATM cells, although input data buffers 18, for switching UBR ATM cells are not shown in FIG. 1.

As an alternative arrangement, the output ports may be provided with a common data store, wherein the limit table data is stored and accessed by each bandwidth allocator 24.

As will be appreciated by those skilled in the art, various modifications may be made to the embodiments hereinbefore described without departing from the scope of the present invention. In particular, the broadband ATM switch may be any broadband telecommunications switch which requires packetised data to be switched between a plurality of input ports to a plurality of output ports, wherein the bandwidth at the output port is substantially limited.

What is claimed is:

1. A broadband telecommunications switch for switching packets of data received on a plurality of input ports to a plurality of bandwidth limited output ports, said switch comprising:

for each input port a control processor which operates to communicate request data across the switch for each of a plurality of switching periods, to each of a plurality of bandwidth allocators operatively associated with said output ports, which request data is representative of a request for communications bandwidth from said output ports sufficient to accommodate packets of data received at said input ports during a corresponding switching period, each of said bandwidth allocators responding to said request data by generating bandwidth allocation data appertaining to an allocation of a share of the bandwidth of an output port to the input ports, and communicating bandwidth allocation data to each of said input ports, and said input ports using said share of bandwidth to switch data to said output ports; and a data store means, for storing limit table data appertaining to a predefined relationship between an amount of data to be switched from an inlet port to an outlet port in correspondence with a bandwidth of the output port to be allocated to the input port for switching said data;

wherein each bandwidth allocator operates in combination with the limit table data to generate a limited bandwidth allocation, determined in dependence upon an amount of data to be switched from the input ports and a share of the bandwidth of the output ports to be allocated to the input ports, whereby an allocation of an excessive amount of bandwidth of an output port to one of said input ports for switching a relatively small amount of data is avoided.

2. The switch according to claim 1, wherein the data store means comprises a common data store coupled to each bandwidth allocator for providing a common limit table.

3. The switch according to claim 1, wherein each of said bandwidth allocators comprises a data store which data stores together define the data store means.

4. The broadband telecommunications switch as claimed in claim 1, wherein each of said input ports further includes for each output port a buffer for buffering data packets received at the input port before being communicated to a respective output port via said switch core.

5. The broadband telecommunications switch as claimed in claim 4, wherein the request data is generated in accordance with an amount of data packets present in said buffers of said input ports for communication to said output ports, at a first predetermined temporal position within said corresponding switching period.

6. The broadband telecommunications switch as claimed in claim 1, wherein said bandwidth allocation data is generated by said bandwidth allocators in correspondence with a second predetermined temporal position within said corresponding switching period.

7. The broadband telecommunications switch as claimed in claim 1, wherein said input ports are configured in accordance with said bandwidth allocation data substantially for the duration of an associated switching period.

8. The broadband telecommunications switch as claimed in claim 7, wherein said corresponding switching period and said associated switching period are contiguous.

9. The broadband telecommunications switch as claimed in claim 7, wherein said corresponding switching period and said associated switching period are the same switching period.

10. The broadband telecommunications switch as claimed in claim 5, wherein said first predetermined temporal position within said corresponding switching period is determined by a polling event.

11. The broadband telecommunications switch as claimed in claim 10, wherein said polling event is determined by a common clock coupled to said control processors, which clock operates to generate a synchronized polling signal.

12. The broadband telecommunications switch as claimed in claim 1, wherein each input port is co-located with an output port, so that each control processor of an input port is operatively associated with a bandwidth allocator of a corresponding output port.

13. The broadband telecommunications switch as claimed in claim 12, wherein the polling event is determined by a temporal position at which each of said bandwidth allocators receives request data from one of said control processors, in response to which each of the other said control processors operatively associated with said bandwidths allocators generate and communicate request data.

14. The broadband telecommunications switch as claimed in claim 1, wherein said switch further includes means to switch data packets from a Constant Bit Rate bearer across said switch core in priority to other data packets and to said request data.

15. The broadband telecommunications switch as claimed in claim 1, wherein the bandwidth of the output ports allocated to the input ports for switching Variable Bit Rate and Available Bit Rate data packets, is calculated by subtracting from a total link bandwidth of the output port, bandwidth allocated to Constant Bit Rate bearers.

16. The broadband telecommunications switch as claimed in claim 1, wherein the bandwidth allocators associated with said output ports further operate to allocate surplus bandwidth of said output ports to input ports for switching data packets conveyed in accordance with an Unspecified Bit Rate (UBR) service across said switch.

17. The broadband telecommunications switch as claimed in claim 1, wherein the bandwidth allocators operate to calculate surplus bandwidth appertaining to the bandwidth of the output ports which has not been allocated to the input ports as a result of an allocation limited in accordance with said limit table.

18. The broadband telecommunications switch as claimed in claim 17, wherein the bandwidth allocators associated with said output ports further operate to allocate said surplus bandwidth of said output ports to input ports for switching data packets conveyed in accordance with an Unspecified Bit Rate (UBR) service across said switch.

19. The broadband telecommunications switch as claimed in claim 1, further comprising for each output port a buffer operatively associated therewith for buffering data packets to be egressed from said switch from said output ports.

20. The broadband telecommunications switch as claimed in claim 1, wherein each of said control processors further operates to weight each share of the allocated bandwidth from each of the output ports, so that a total of each of share of the bandwidth of the output ports does not exceed a total link bandwidth of a link communicating the input port to said switch core.

21. The broadband telecommunications switch as claimed in claim 1, wherein said broadband telecommunications switch is an Asynchronous Transfer Mode (ATM) telecommunications switch, and said data packets are ATM cells.

22. A method of switching data packets from a plurality of input ports to a plurality of output ports across a switch core, comprising the steps of:

(i) for each input port, generating request data representative of a number of data packets to be switched by said input port to respective output ports;

(ii) for each input port, contemporaneously switching the request data generated in step (i) across the switch to said respective output ports;

(iii) for each output port, determining a share of the bandwidth of the output port to provide to said input ports in accordance with said request data received from the input ports, and conveying bandwidth allocation data corresponding to the bandwidth of the output port allocated to each input port across the switch core to each of the input ports, thereby allocating the bandwidth of the output ports to the input ports for a predetermined switching period, to effect egress communication of the data packets;

wherein step (iii) further includes the steps of, (iv) comparing the bandwidth of said output ports allocated to said input ports and the number of data packets to be switched in the switching period, with a predetermined relationship in a form of a limit table representative of a predetermined limited allocated bandwidth of said output ports and numbers of data packets to be switched from said input ports; and (v) where the bandwidth of said output ports to be allocated to said input ports exceeds said predetermined relationship, limiting said bandwidth allocation in accordance with said limit table.

23. The method of switching data packets as claimed in claim 22, further comprising:

(vi) for each input port, consequent upon receipt of bandwidth allocations from said output ports, weighting the bandwidth allocated so that a total link bandwidth for communicating data packets from the input port to the output port is not exceeded; and (vii) communication data packets to said output ports from said input ports in accordance with bandwidth allocated in step (iv).

24. The method of switching data packets as claimed in claim 23, further comprising the steps of, (viii) repeating steps (i) and (v), for each of a plurality of switching periods.

25. The method of switching data packets as claimed in claim 22, wherein:

step (i) of said method includes the step of storing data packets received at said input ports in each of a plurality of data stores associated with each of said input ports; and each of said data stores corresponds to one of said output ports.

26. The method of switching data packets as claimed in claim 25, wherein said request data generated in step (ii) of said method is representative of a number of data packets present in said data stores at a predetermined temporal position within one of said switching periods.

27. The method of switching data packets as claimed in claim 23, wherein said switching period is determined with reference to a time when request data from one of said input ports is received at said output ports.

28. The method of switching data packets as claimed in claim 22, further comprising:

(ix) for each output port calculating surplus bandwidth representative of a difference between the bandwidth allocated to said input ports in accordance with step (v) and a total available bandwidth of said output port; and, (x) allocating said surplus bandwidth to switch data packets associated with Unspecified Bit Rate (UBR) bearer.

29. The method of switching data packets as claimed in claim 28, wherein said total available bandwidth in step (ix) of said method is calculated by subtracting bandwidth allocated to constant Bit Rate bearers from a total link bandwidth of said output ports.

30. The method of switching data packets as claimed in claim 23, wherein the data packets are ATM cells, said method being performed by an ATM switch.

* * * * *